United States Patent [19]

Hamilton

[11] Patent Number: 4,860,139

[45] Date of Patent: Aug. 22, 1989

[54] PLANARIZED READ/WRITE HEAD AND METHOD

[75] Inventor: Harold J. Hamilton, Santa Clara, Calif.

[73] Assignee: Censtor Corporation, San Jose, Calif.

[21] Appl. No.: 64,184

[22] Filed: Jun. 19, 1987

[51] Int. Cl.$^4$ .............................................. G11B 5/16
[52] U.S. Cl. ..................................... 360/126; 29/603
[58] Field of Search ............... 360/126, 127, 111; 29/603

[56] References Cited

U.S. PATENT DOCUMENTS

| | | | |
|---|---|---|---|
| 4,422,118 | 12/1983 | Helle et al. | 360/126 |
| 4,423,450 | 12/1983 | Hamilton | 360/111 |
| 4,516,180 | 5/1985 | Narishige et al. | 360/126 |

FOREIGN PATENT DOCUMENTS

| | | | |
|---|---|---|---|
| 52-33712 | 3/1977 | Japan | 360/126 |
| 55-84025 | 6/1980 | Japan | 360/126 |

OTHER PUBLICATIONS

IBM/TDB, vol. 9, No. 2, Jul. 1966, p. 124, "Readback Head for High Density Recording", by Morrison et al.

*Primary Examiner*—John H. Wolff
*Attorney, Agent, or Firm*—Kolisch, Hartwell & Dickinson

[57] ABSTRACT

A probe-type, electromagnetic read/write head for perpendicular reading and writing, and a method for making the same, wherein the resulting head is characterized by a flux-return portion, and a pole portion which is spaced from but magnetically coupled to the pole portion, with its side which faces the flux-return portion, throughout its entirety, being planar.

2 Claims, 1 Drawing Sheet

PLANARIZED READ/WRITE HEAD AND METHOD

BACKGROUND AND SUMMARY OF THE INVENTION

This invention pertains to an electromagnetic read/write head for perpendicular reading and writing, and more particularly, to what is referred to as a probe or single pole head.

Conventional probe heads for perpendicular recording (reading/writing) may be made by fabricating the coil and thin-film pole and yoke structure on a ferrite body which functions both as a magnetic return structure and as an air-bearing structure. Alternatively, a plated or otherwise deposited high permeability alloy layer may serve as the magnetic return structure. The coil or coils in such a head typically reside in a body of insulative material, such as hard-baked photoresist, and following formation of the coils in this body of material, a pole and yoke structure is formed over the insulated coil structure by plating a high permeability magnetic alloy, e.g., nickel-iron, through a patterned photoresist mask.

One problem with what has just been described is that the surface of the insulated coil structure is non-planar, since the hard-baked photoresist must not extend to the tip of the pole and the air bearing surface where it would lead to unreliable mechanical operation. Such a non-planar surface presents severe problems, especially for high topography multilayer coil structures, in precisely patterning the pole and yoke because the photomask is not everywhere in contact with the photoresist during exposure, and the resulting Fresnel diffraction leads to pattern distortion. This distortion becomes particularly troublesome as the width of the pole tip is made smaller, i.e., as the track density capability of the head increases.

A second and equally serious consequence of the nonplanar nature of the substrate on which the pole and yoke are fabricated has to do with the sensitivity of the magnetic properties of thin magnetic films to the texture and topography of the surface on which such films are formed, as well as the thermal and chemical stability of the substrate during subsequent annealing or thermal cycling. In general, the smoother and the flatter the substrate, and the less stress resulting from thermal cycling, the easier it is to create patterned magnetic films with excellent soft magnetic properties. The fact that the pole tip must be formed on a suitable inorganic surface (for reasons stated above) while the yoke is formed on the surface of an organic material is a concern when considering the widely different coefficients of expansion of the materials.

A general object of the present invention is to avoid the problems which attend the preparation of such a pole structure over uneven territory.

More particularly, an important object of the invention is to provide a highly polished, planarized inorganic surface on which to form the pole and yoke structure so as completely to avoid the topographical and materials incompatibility problems discussed above.

For the purposes of illustration herein, two different embodiments of a head formed in accordance with the invention are disclosed, in one of which the coil is embedded in a body of hard-baked photoresist, and in the other of which, the coil is formed in an inorganic material such as aluminum oxide.

The various important features and offered advantages of the invention (structure and method) will become more fully apparent as the description that now follows is read in conjunction with the accompanying drawings.

DETAILED DESCRIPTION OF THE INVENTION

Figure 1:
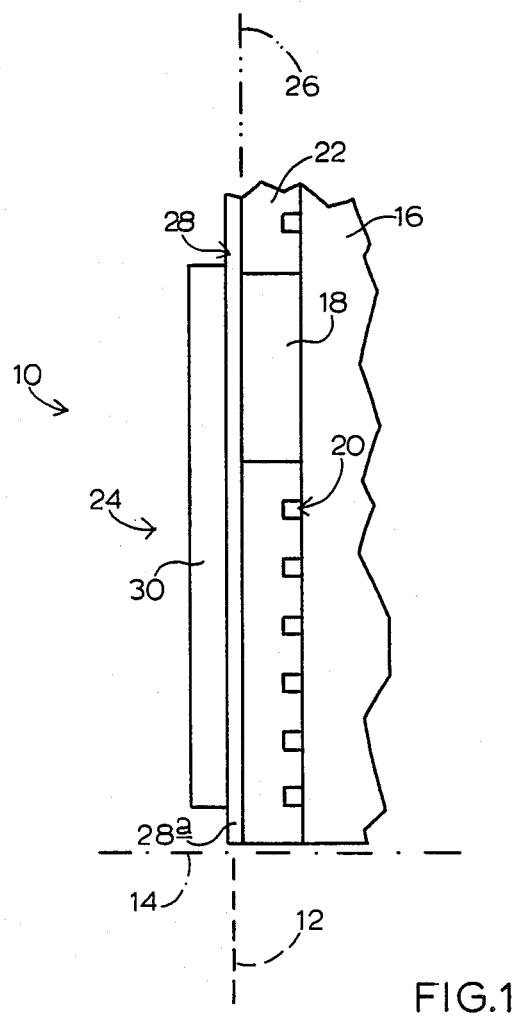
FIG. 1 is a fragmentary cross-section of a read/write head constructed according to the invention.

Turning now to the drawings, and referring first of all to FIG. 1, indicated generally at 10 is a probe type read/write head structure intended for reading and writing on two-layer perpendicular media, and constructed in accordance with the invention. This structure, which is a thin-film structure, is intended for generating and sensing magnetic fields predominantly along an axis 12 which is perpendicular to a plane 14 that defines the travel plane for a recording medium moving closely beneath the lower end of structure 10.

Included in head structure 10 is a ferrite body 16, or magnetic flux-return structure, or portion, on the left-hand planar surface of which has been formed a soft magnetic (typically nickel-iron) stud-like projection 18. Surrounding this projection is a spirally formed plural-turn conductive coil 20 which is overlaid with, or embedded in, a body 22 of aluminum oxide (insulator means). For the purpose of simplifying FIG. 1, only a single-layer coil is shown around projection 18. However, it is well recognized that two or more coil layers may be employed.

Projection 18 and coil 20 are formed by separate, conventional photomasking and deposition and/or etching techniques, whereafter aluminum oxide, which ultimately ends up forming body, or layer, 22, is deposited, e.g., by sputtering, as a blanket over the structure so far described.

There now follows in the manufacture of head structure 10 a step which is key to offering the important planarized surface, or expanse, onto which the pole, or pole portion, shown generally at 24 is thereafter formed. In particular, the exposed outside surface, or face, of the blanket of aluminum oxide which has been formed is lapped to create a planar (non-angular) surface, or expanse, which lies in plane 26. Such lapping is performed, of course, to assure that the projection 18 of soft magnetic material is also exposed with an outer surface which is co-planar with the lapped surface of the aluminum oxide body. The structure so far described is referred to herein as a pole-support structure.

Thus, it will be immediately obvious that a smooth, planar, non-angular face, or surface, or contact expanse, of inorganic substance is exposed for the photomask-defined formation and patterning of pole 28. This takes place through a first-step deposition of a thin film 28 of nickel-iron, the lower end 28a of which in FIG. 1 forms the pole tip in the pole. One can readily see that the planarity along plane 26 which is offered for deposition of this thin film obviates the optical diffraction and surface topography problems which were mentioned earlier. Thereafter, a thicker film 30 of nickel-iron is deposited to form, along with the portion of layer 28 which underlies it, the yoke in pole 24. Thus, the side of pole 24 which faces body 16 is planar. The pole couples magnetically through projection 18 with ferrite body 16. Alternatively, the yoke may be plated first and the remainder of the pole later.

Obviously, the simple fabrication procedure which has just been described effectively circumvents the problems discussed above relative to the formation of pole structures on high topography surfaces composed of both organic and inorganic materials.

Figure 2:
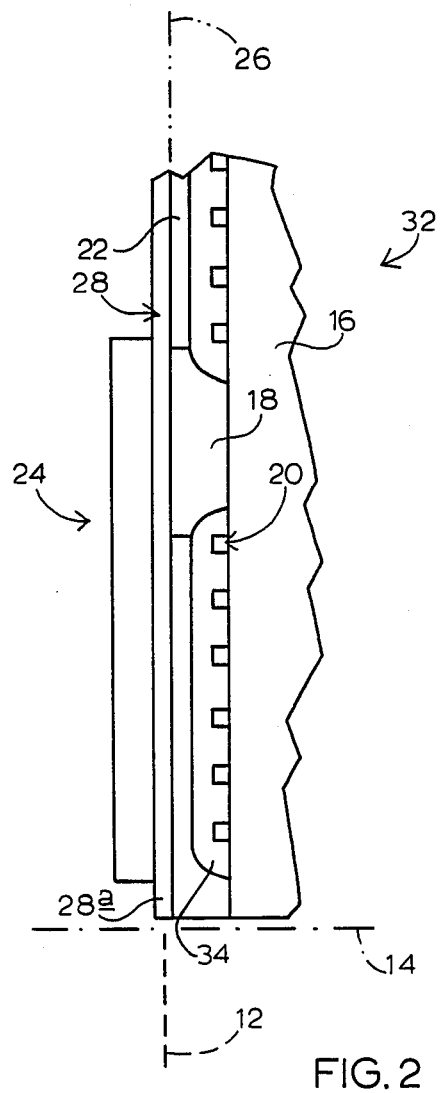
FIG. 2 is similar to FIG. 1, but shows another embodiment of a read/write head constructed in accordance with the invention.

Directing attention now to FIG. 2, here there is shown generally at 32 a probe-type read/write head structure, also constructed in accordance with the invention, illustrating a somewhat modified version of the head structure shown in FIG. 1. Throughout FIG. 2, structures therein which are the same as corresponding structures in head structure 10 are given the same reference numerals.

Head structure 32 differs from head structure 10 principally in that coil 20 is embedded in a body 34 of organic insulating material, such as, for example, hard-baked photoresist. The procedure for arriving at this structure includes the photomask-defined formation, e.g., by plating, of coil 20 onto the left face of body 16, and thereafter, the photomask-patterning of photoresist body 34.

With this structure in place, projection 18, which has a slightly different cross-sectional shape than that of projection 18 in FIG. 1, is formed by plating. Thereafter a body 22 of insulating aluminum oxide is deposited as by sputtering over the entire left face of the structure in FIG. 2 (that is, the structure so far described).

Lapping is then performed to create a planar surface, or expanse, along plane 26, exposing a co-planar surface in projection 18, and head structure 24 is formed thereover as before described.

Obviously structure 32, vis-a-vis its planarization feature, is the same as head structure 10.

While preferred embodiments of the invention, and patterns of steps in the method of making the same, have been described herein, it is appreciated that variations and modifications may be made without departing from the spirit of the invention.

It is claimed and desired to secure by Letters Patent:

1. A thin-film, probe-type, electromagnetic read/write head for perpendicular reading and writing comprising
   a flux-return portion,
   plural-turn coil means for carrying electrical current embedded in insulator means disposed to one side of said flux-return portion, said insulator means having a planar facial expanse substantially paralleling and facing away from said flux-return portion,
   a pole portion spaced from but magnetically coupled to said flux-return portion, said pole portion including a side facing said flux-return portion, said side, throughout its entirety, residing on said facial expanse, and
   a film of magnetic material formed on the side of said pole portion which is opposite the latter's first-mentioned side and cooperating with the pole portion to create a yoke in the head,
   said coil means, insulator means, pole portion and film residing in compact, parallel abutting planes.

2. A method of making a thin-film, probe-type, electromagnetic read/write head for perpendicular reading and writing comprising
   preparing a flux-return portion,
   forming on one side of such flux-return portion a plural-turn electrical current-carrying coil embedded in insulator structure with the latter having a planar facial expanse substantially paralleling and facing away from the flux-return portion,
   creating, in spaced and magnetically coupled relation to the flux-return portion, a pole portion which includes a side facing the flux-return portion characterized throughout by planarity,
   preparing on the side of such pole portion which is opposite the latter's first-mentioned side a film of magnetic material which cooperates with the pole portion to produce a yoke in the head, and
   executing the above steps in such a manner as to produce a head wherein the coil, the insulator structure, the pole portion and the film reside in compact, parallel abutting planes.

* * * * *